(12) United States Patent
Lee et al.

(10) Patent No.: US 12,031,021 B2
(45) Date of Patent: Jul. 9, 2024

(54) POLYOLEFIN

(71) Applicant: HANWHA SOLUTIONS CORPORATION, Seoul (KR)

(72) Inventors: In Jun Lee, Daejeon (KR); Jisong Jo, Daejeon (KR)

(73) Assignee: HANWHA SOLUTIONS CORPORATION, Seoul (KR)

( * ) Notice: Subject to any disclaimer, the term of this patent is extended or adjusted under 35 U.S.C. 154(b) by 624 days.

(21) Appl. No.: 17/283,571

(22) PCT Filed: Oct. 11, 2019

(86) PCT No.: PCT/KR2019/013320
§ 371 (c)(1),
(2) Date: Apr. 8, 2021

(87) PCT Pub. No.: WO2020/080744
PCT Pub. Date: Apr. 23, 2020

(65) Prior Publication Data
US 2021/0388191 A1  Dec. 16, 2021

(30) Foreign Application Priority Data
Oct. 19, 2018 (KR) ................. 10-2018-0124837

(51) Int. Cl.
*C08F 210/16* (2006.01)
*C08J 5/18* (2006.01)
*C08L 23/08* (2006.01)

(52) U.S. Cl.
CPC ........ *C08L 23/0815* (2013.01); *C08F 210/16* (2013.01); *C08J 5/18* (2013.01); *C08F 2500/04* (2013.01); *C08F 2500/09* (2013.01); *C08F 2500/12* (2013.01); *C08L 2201/10* (2013.01);
(Continued)

(58) Field of Classification Search
CPC .......................... C08F 210/16; C08F 2500/04; C08F 2500/09; C08F 2500/12
See application file for complete search history.

(56) References Cited

U.S. PATENT DOCUMENTS

| 8,962,755 | B2 * | 2/2015 | Wang | ............... C08L 23/08 526/348 |
| 10,717,790 | B2 * | 7/2020 | Ye | .................. C08F 4/02 |
| 10,941,284 | B2 * | 3/2021 | Chandak | ........... C08F 4/64148 |

(Continued)

FOREIGN PATENT DOCUMENTS

| EP | 3851462 A1 | 7/2021 |
| JP | 10298234 A | 11/1998 |

(Continued)

OTHER PUBLICATIONS

JP Office Action dated May 10, 2022.
(Continued)

*Primary Examiner* — Rip A Lee
(74) *Attorney, Agent, or Firm* — Harvest IP Law, LLP

(57) ABSTRACT

The present invention relates to a polyolefin and a film molded therefrom. Specifically, the present invention relates to a polyolefin, particularly a linear low-density polyethylene, which is prepared by a hybrid catalyst comprising different transition metal compounds and has excellent processability, impact strength, and haze, and to a film prepared therefrom.

11 Claims, 4 Drawing Sheets

Example 1

Example 2

(52) U.S. Cl.
CPC ..... *C08L 2203/16* (2013.01); *C08L 2207/066* (2013.01)

(56) References Cited

U.S. PATENT DOCUMENTS

| | | | | |
|---|---|---|---|---|
| 11,142,597 | B2* | 10/2021 | Chandak | ............. C08F 4/64148 |
| 11,186,601 | B2* | 11/2021 | Holtcamp | ............ C08F 4/65925 |
| 11,274,196 | B2* | 3/2022 | Li | ....................... C08F 4/65925 |
| 11,279,779 | B2* | 3/2022 | Kuhlman | ................... C08F 2/04 |
| 2011/0003099 | A1 | 1/2011 | Vinck | |
| 2012/0238720 | A1 | 9/2012 | Lam | |
| 2013/0029125 | A1* | 1/2013 | Tse | .......................... C08L 23/08 |
| | | | | 525/240 |
| 2018/0155474 | A1* | 6/2018 | Holtcamp | .................. C08J 5/18 |
| 2019/0161559 | A1* | 5/2019 | Holtcamp | ............ C08F 210/16 |

FOREIGN PATENT DOCUMENTS

| | | |
|---|---|---|
| JP | 2010150520 A | 7/2010 |
| KR | 100379138 B1 | 8/2003 |
| KR | 1020120081318 A | 7/2012 |
| KR | 1020130001889 A | 1/2013 |
| KR | 1020150099543 A | 8/2015 |
| KR | 2019-0082225 A | 7/2019 |
| WO | 2016171808 A1 | 10/2016 |
| WO | 2016172279 A1 | 10/2016 |
| WO | 2018089193 A1 | 5/2018 |
| WO | WO 2018/089193 A1 * | 5/2018 ............ C08F 210/02 |

OTHER PUBLICATIONS

CN Office Action dated Sep. 27, 2022.
International Search Report dated Jan. 31, 2020.
European Search Report dated Jun. 14, 2022.

* cited by examiner

[Fig. 1a]
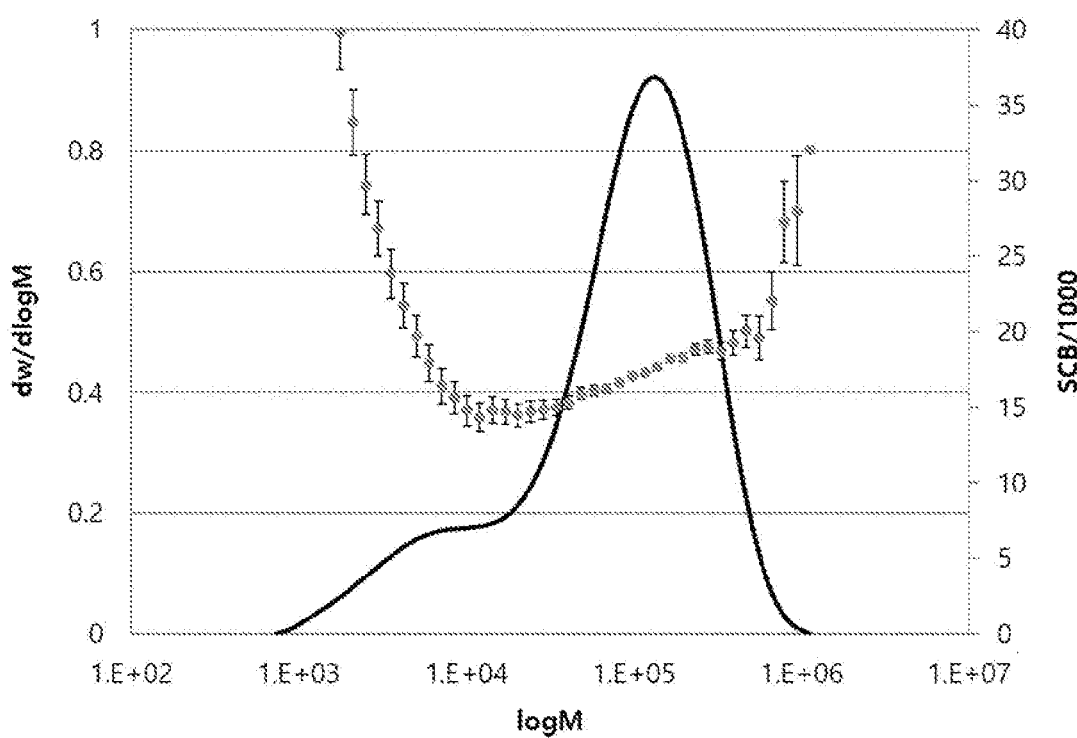

[Fig. 1b]
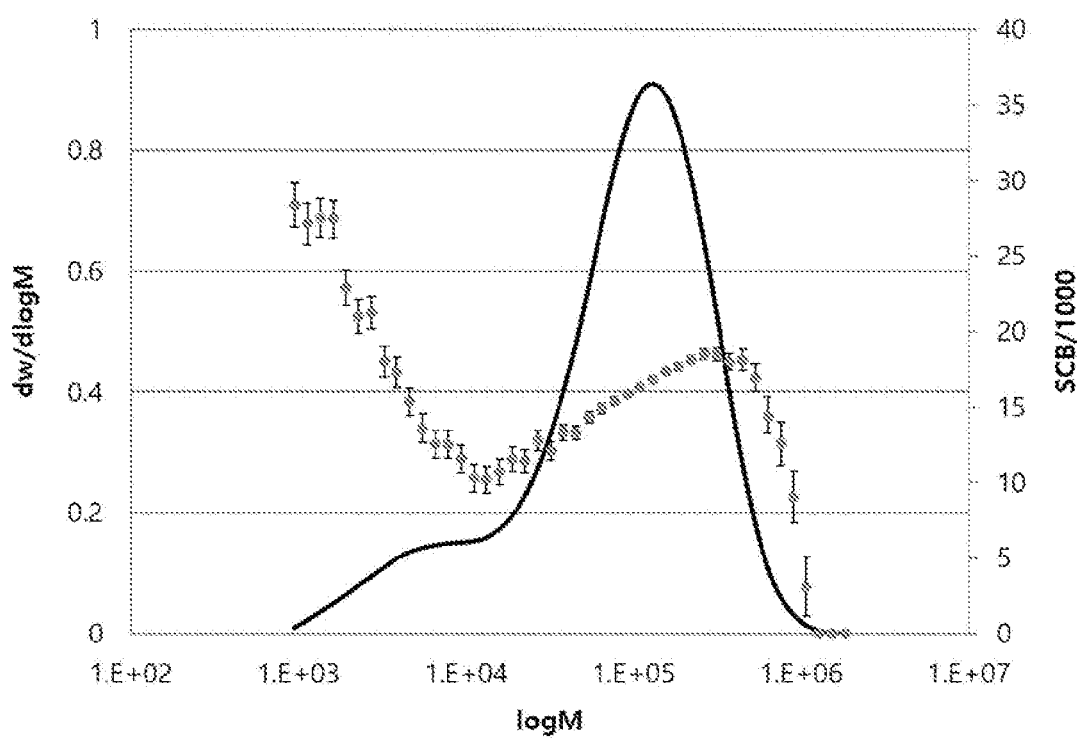

[Fig. 2]
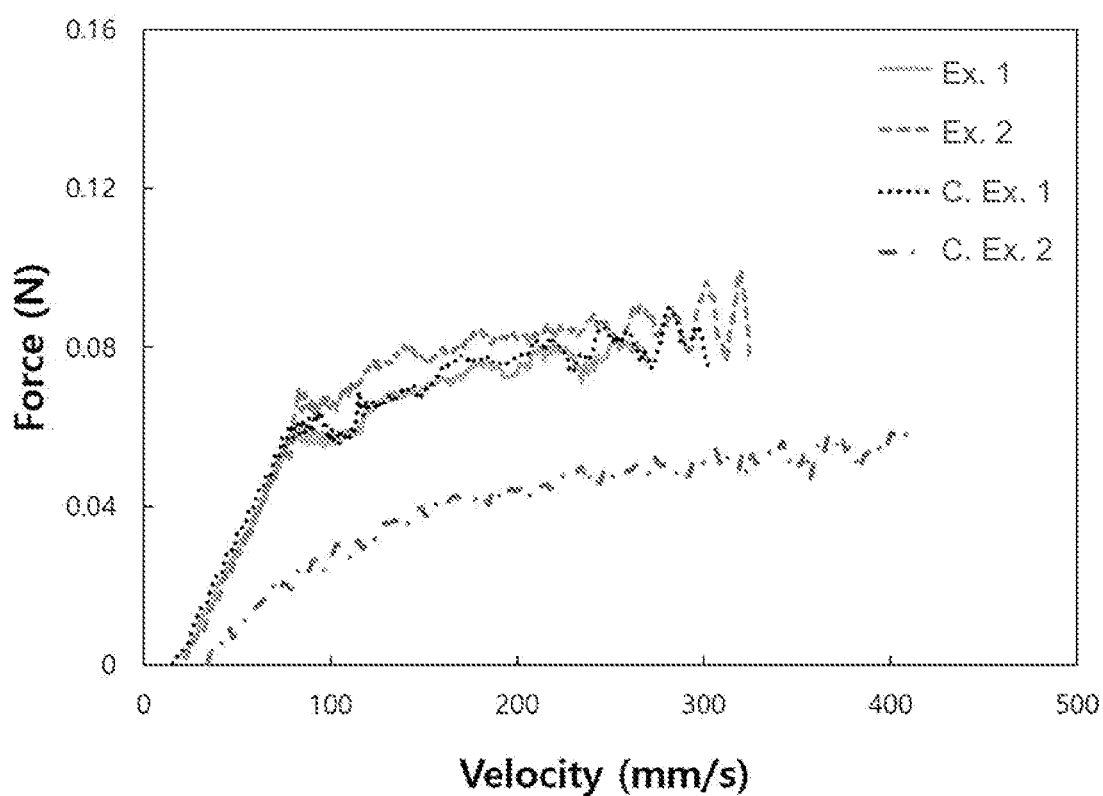

[Fig. 3]
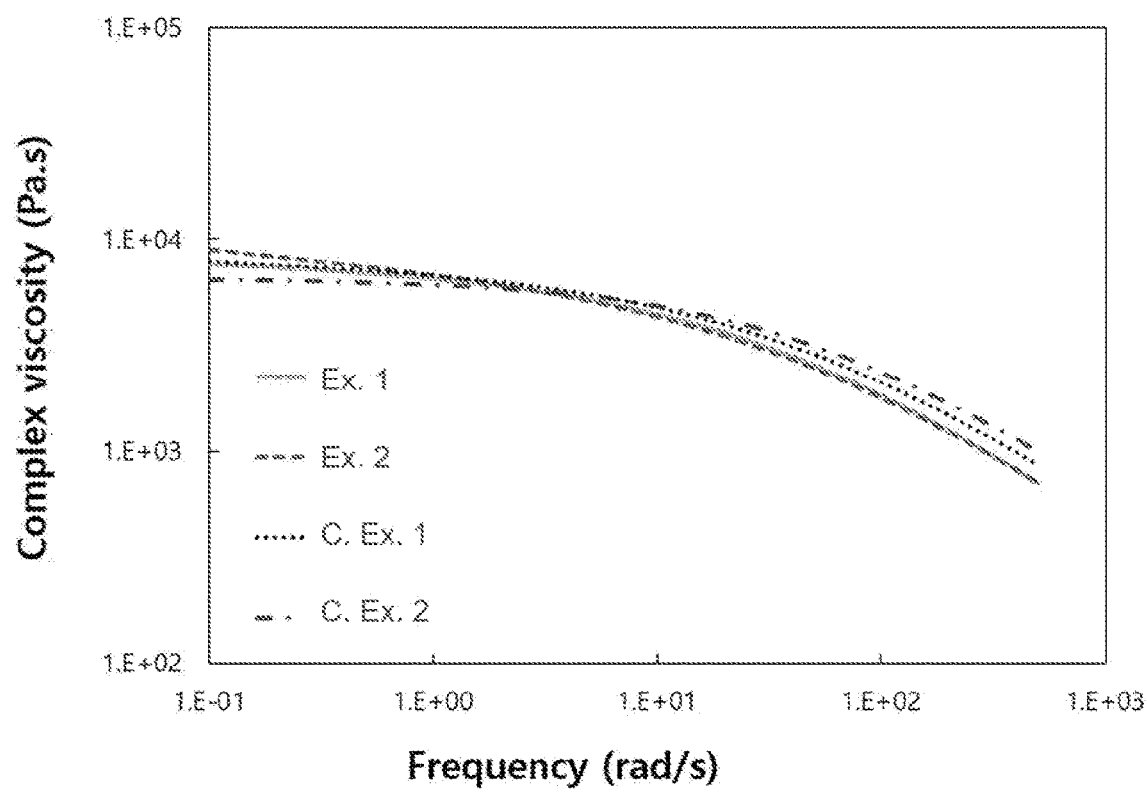

POLYOLEFIN

CROSS-REFERENCE TO RELATED APPLICATIONS

This application is a National Stage of International Application No. PCT/KR2019/013320 filed Oct. 11, 2019, claiming priority based on Korean Patent Application No. 10-2018-0124837 filed Oct. 19, 2018.

TECHNICAL FIELD

The present invention relates to a polyolefin and a film molded therefrom. Specifically, the present invention relates to a polyolefin, particularly a linear low-density polyethylene, which is prepared by a hybrid catalyst comprising different transition metal compounds and has excellent processability, impact strength, and haze, and to a film prepared therefrom.

BACKGROUND ART

A metallocene catalyst, which is one of the catalysts used in the polymerization of olefins, is a compound in which a ligand such as cyclopentadienyl, indenyl, and cycloheptadienyl is coordinated to a transition metal or a transition metal halide compound. It has a sandwich structure in its basic form.

In a Ziegler-Natta catalyst, which is another catalyst used in the polymerization of olefins, the metal component serving as the active sites is dispersed on an inert solid surface, whereby the properties of the active sites are not uniform. On the other hand, since a metallocene catalyst is a single compound having a specific structure, it is known as a single-site catalyst in which all active sites have the same polymerization characteristics. A polymer prepared by such a metallocene catalyst is characterized by a narrow molecular weight distribution and a uniform distribution of comonomers.

Meanwhile, a linear low-density polyethylene (LLDPE) is produced by copolymerizing ethylene and an alpha-olefin at a low pressure using a polymerization catalyst. It has a narrow molecular weight distribution and short chain branches (SCBs) having a certain length, but generally does not have long chain branches (LCBs). Films prepared from a linear low-density polyethylene have high strength at breakage, elongation, tear strength, and impact strength in addition to the characteristics of common polyethylenes. They are widely used for stretch films and overlap films to which conventional low-density polyethylenes or high-density polyethylene are difficult to be applied.

When a linear low-density polyethylene produced by a metallocene catalyst has excellent processability and haze of a film, the strength of the film tends to decrease. On the other hand, when the film has excellent strength, the processability and haze tend to decrease.

Accordingly, there has been a need for a polyolefin, particularly a linear low-density polyolefin, having excellent processability and capable of providing a film with excellent impact strength and haze.

DETAILED DESCRIPTION OF THE INVENTION TECHNICAL PROBLEM

An object of the present invention is to provide a polyolefin, particularly a linear low-density polyolefin, having excellent processability, impact strength, and haze.

Another object of the present invention is to provide a film molded from a polyolefin, particularly a linear low-density polyolefin, and having excellent impact strength and haze.

Technical Solution

According to an embodiment of the present invention for achieving the object, there is provided a polyolefin having (1) a molecular weight distribution represented as a polydispersity index (Mw/Mn) of 5 to 20, (2) a density of 0.910 to 0.930 g/cm$^3$, (3) a melt index of 0.5 to 2.0 g/10 minutes when measured at 190° C. under a load of 2.16 kg, and (4) a melt index ratio ($MI_{21.6}/MI_{2.16}$) of 20 to 30.

Preferably, the weight average molecular weight (Mw) of the polyolefin is 50,000 to 250,000 g/mole.

The polyolefin has a BOCD index of 0 to 3.0 as defined by the following Equation 1.

BOCD index=(content of short chain branches in the high-molecular weight component−content of short chain branches in the low-molecular weight component)/(content of short chain branches in the low-molecular weight component) [Equation 1]

The polyolefin has a content of long chain branches of 0.01 to 0.1 per 10,000 carbon atoms.

The polyolefin has a $c_2$ value of −0.3 to −0.2 when a graph of the complex index (Pa·s) with respect to the frequency (rad/s) is fitted with the power law of the following Equation 2.

$$y=c_1 x^{c_2}$$ [Equation 2]

The polyolefin has a shear thinning index of 10 to 15 as defined by the following Equation 3.

Shear thinning index=$\eta_0/\eta_{500}$ [Equation 3]

In Equation 3, $\eta_0$ is a complex viscosity at a frequency of 0.1 rad/s, and $\eta_{500}$ is a complex viscosity at a frequency of 500 rad/s.

The polyolefin is a copolymer of an olefinic monomer and an olefinic comonomer. Specifically, the olefinic monomer is ethylene, and the olefinic comonomer is at least one selected from the group consisting of propylene, 1-butene, 1-pentene, 4-methyl-1-pentene, 1-hexene, 1-heptene, 1-octene, 1-decene, 1-undecene, 1-dodecene, 1-tetradecene, and 1-hexadecene.

Preferably, the polyolefin is a linear low-density polyethylene in which the olefinic monomer is ethylene, and the olefinic comonomer is 1-hexene.

According to another embodiment of the present invention, there is provided a film molded from the polyolefin.

The film has a haze of 10% or less and a drop impact strength of 600 g or more.

Advantageous Effects of the Invention

The polyolefin prepared in the presence of a metallocene catalyst for olefin polymerization according to an embodiment of the present invention not only has excellent processability but also has excellent impact strength and haze. Accordingly, since a film produced therefrom has excellent impact strength and haze, it can be advantageously used as a stretch film, an overlap film, or the like.

BRIEF DESCRIPTION OF THE DRAWING

FIGS. 1a and 1b are GPC-FTIR graphs for measuring the BOCD index of the polyolefins of Examples 1 and 2 of the present invention, respectively.

FIG. 2 is a graph for measuring the melt strength of the polyolefins of the Examples and Comparative Examples of the present invention.

FIG. 3 is a graph showing the complex viscosity with respect to the frequency of the polyolefins of the Examples and Comparative Examples of the present invention.

BEST MODE FOR CARRYING OUT THE INVENTION

Hereinafter, the present invention will be described in more detail.

Catalyst for Olefin Polymerization

The catalyst for olefin polymerization according to an embodiment of the present invention comprises a first transition metal compound represented by Formula A and a second transition metal compound represented by Formula B.

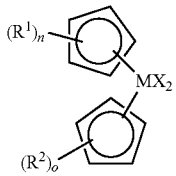

[Formula A]

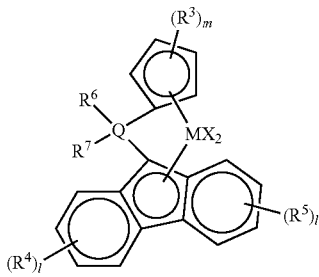

[Formula B]

In Formulae A and B, n and o are each an integer of 0 to 2, provided that at least one of them is not 0, and m and l are each an integer of 0 to 4. Specifically, n and o may each be 1 or 2, and m and l may each be 1.

M is titanium (Ti), zirconium (Zr), or hafnium (Hf). Specifically, M may be zirconium (Zr).

X is each independently halogen, $C_{1-20}$ alkyl, $C_{2-20}$ alkenyl, $C_{2-20}$ alkynyl, $C_{6-20}$ aryl, $C_{1-20}$ alkyl $C_{6-20}$ aryl, $C_{6-20}$ aryl $C_{1-20}$ alkyl, $C_{1-20}$ alkylamido, $C_{6-20}$ arylamido, or $C_{1-20}$ alkylidene. Specifically, X may each be halogen. More specifically, X may each be chlorine (Cl).

Q is carbon (C), silicon (Si), germanium (Ge), or tin (Sn). Specifically, Q may be carbon (C).

$R^1$ to $R^7$ are each independently substituted or unsubstituted $C_{1-20}$ alkyl, substituted or unsubstituted $C_{2-20}$ alkenyl, substituted or unsubstituted $C_{6-20}$ aryl, substituted or unsubstituted $C_{1-20}$ alkyl $C_{6-20}$ aryl, substituted or unsubstituted $C_{6-20}$ aryl $C_{1-20}$ alkyl, substituted or unsubstituted $C_{1-20}$ heteroalkyl, substituted or unsubstituted $C_{3-20}$ heteroaryl, substituted or unsubstituted $C_{1-20}$ alkylamido, substituted or unsubstituted $C_{6-20}$ arylamido, substituted or unsubstituted $C_{1-20}$ alkylidene, or substituted or unsubstituted $C_{1-20}$ silyl. Here, at least one of $R^1$ and $R^2$ is independently linked to adjacent groups to form a substituted or unsubstituted saturated $C_{4-20}$ ring. In addition, $R^3$ to $R^7$ may each independently be linked to adjacent groups to form a substituted or unsubstituted saturated or unsaturated $C_{4-20}$ ring.

Specifically, at least one of $R^1$ and $R^2$ may independently be linked to adjacent groups to form a substituted or unsubstituted saturated or unsaturated $C_{4-20}$ ring. More specifically, $R^1$ and $R^2$ are each linked to adjacent groups to form an unsubstituted unsaturated $C_4$ ring.

Specifically, $R^3$ may be $C_{1-20}$ alkyl. More specifically, $R^3$ may be $C_{1-6}$ alkyl. Preferably, $R^3$ is n-butyl.

Specifically, $R^4$ and $R^5$ may each be $C_{1-20}$ alkyl. More specifically, $R^4$ and $R^5$ may each be $C_{1-6}$ alkyl. Preferably, $R^4$ and $R^5$ are each t-butyl.

Specifically, $R^6$ and $R^7$ may each be $C_{6-20}$ aryl. More specifically, $R^6$ and $R^7$ may each be phenyl.

In a preferred embodiment of the present invention, the compound represented by Formula A may be a compound represented by Formula A-1. In addition, the compound represented by Formula B may be a compound represented by Formula B-1.

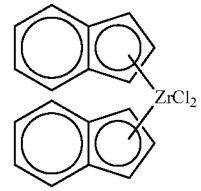

[Formula A-1]

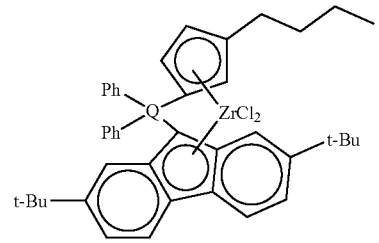

[Formula B-1]

The catalyst for olefin polymerization according to an embodiment of the present invention may comprise the first transition metal compound and the second transition metal compound at a weight ratio of 20:1 to 1:20. Preferably, the catalyst for olefin polymerization may comprise the first transition metal compound and the second transition metal compound at a weight ratio of 10:1 to 1:10. More preferably, the catalyst for olefin polymerization may comprise the first transition metal compound and the second transition metal compound at a weight ratio of 6:4 to 4:6. When the content ratio of the first transition metal compound and the second transition metal compound is within the above range, an appropriate activity of the supported catalyst may be exhibited, which may be advantageous from the viewpoint of maintaining the activity of the catalyst and economical efficiency. Further, a polyolefin prepared in the presence of the catalyst for polymerizing olefin, which satisfies the above range, has excellent processability, and a film prepared therefrom may have excellent strength and haze.

In general, it is known that polyolefins containing a small amount of short chain branches (SCBs) have poor optical properties, and polyolefins containing a large amount of long chain branches (LCBs) have excessively high elasticity, thereby having poor mechanical properties.

Polyolefins prepared by the first transition metal compound alone contain a small amount of short chain branches and are relatively poor in optical properties. Polyolefins prepared by the second transition metal compound alone have a large amount of short chain branches and long chain branches, whereby they are excellent in optical properties, whereas they are relatively poor in mechanical properties. That is, it is confirmed in experimental ways that it is difficult to satisfy both optical and mechanical properties when any of the first transition metal compound and the second transition metal compound is used alone, or when the ratio of either the first transition metal compound or the second transition metal compound is excessively high.

In contrast, a catalyst for olefin polymerization, which comprises the first transition metal compound and the second transition metal compound at a weight ratio of 0.4:1 to 2.5:1 can produce a polyolefin having excellent strength and haze.

As a preferred example, the catalyst for olefin polymerization according to an embodiment of the present invention may further comprise a cocatalyst compound.

Here, the cocatalyst compound may comprise at least one of a compound represented by Formula 1, a compound represented by Formula 2, and a compound represented by Formula 3.

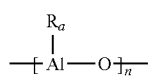

[Formula 1]

In Formula 1, n is an integer of 2 or more, and $R_a$ may each independently be halogen, $C_{1-20}$ hydrocarbon, or $C_{1-20}$ hydrocarbon substituted with halogen. Specifically, $R_a$ may be methyl, ethyl, n-butyl, or isobutyl.

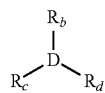

[Formula 2]

In Formula 2, D is aluminum (Al) or boron (B), and $R_b$, $R_c$, and $R_d$ are each independently halogen, $C_{1-20}$ hydrocarbon, $C_{1-20}$ hydrocarbon substituted with halogen, or $C_{1-20}$ alkoxy. Specifically, when D is aluminum (Al), $R_b$, $R_c$, and $R_d$ may each independently be methyl or isobutyl, and when D is boron (B), $R_b$, $R_c$, and $R_d$ may each be pentafluorophenyl.

$$[L-H]^+[Z(A)_4]^- \text{ or } [L]^+[Z(A)_4]^-$$ [Formula 3]

In Formula 3, L is a neutral or cationic Lewis acid, $[L-H]^+$ and $[L]^+$ a Brönsted acid, Z is a group 13 element, and A is each independently substituted or unsubstituted $C_{6-20}$ aryl or substituted or unsubstituted $C_{1-20}$ alkyl. Specifically, $[LH]^+$ may be a dimethylanilinium cation, $[Z(A)_4]^-$ may be $[B(C_6F_5)_4]^-$, and $[L]^+$ may be $[(C_6H_5)_3C]^+$.

Examples of the compound represented by Formula 1 include methylaluminoxane, ethylaluminoxane, isobutylaluminoxane, butylaluminoxane, and the like. Preferred is methylaluminoxane. But it is not limited thereto.

Examples of the compound represented by Formula 2 include trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctyaluminum, ethyldimethylaluminum, methyldiethylaluminum, triphenylaluminum, tri-p-tolylaluminum, dimethylaluminummethoxide, dim ethylaluminumethoxide, trimethylboron, triethylboron, triisobutylboron, tripropylboron, and tributylboron. Preferred are trimethylaluminum, triethylaluminum, and triisobutylaluminum. But it is not limited thereto.

Examples of the compound represented by Formula 3 include triethylammonium tetraphenylborate, tributylammonium tetraphenylborate, trimethylammonium tetraphenylborate, tripropylammonium tetraphenylborate, trimethylammonium tetra(p-tolyl)borate, trimethylammonium tetra (o,p-dimethylphenyl)borate, tributylammonium tetra(p-trifluoromethylphenyl)borate, trimethylammonium tetra(p-trifluoromethylphenyl)borate, tributylammonium tetrapentafluorophenylborate, N,N-diethylanilinium tetraphenylborate, N,N-diethylanilinium tetrapentafluorophenylborate, diethylammonium tetrapentafluorophenylborate, triphenylphosphonium tetraphenylborate, trimethylphosphonium tetraphenylborate, triethylammonium tetraphenylaluminate, tributylammonium tetraphenylaluminate, trimethylammonium tetraphenylaluminate, tripropylammonium tetraphenylaluminate, trimethylammonium tetra(p-tolyl)aluminate, tripropylammonium tetra(p-tolyl)aluminate, triethylammonium tetra(o,p-dimethylphenyl)aluminate, tributylammonium tetra(p-trifluoromethylphenyl)aluminate, trimethylammonium tetra (p-trifluoromethylphenyl)aluminate, tributylammonium tetrapentafluorophenylaluminate, N,N-diethylanilinium tetraphenylaluminate, N,N-diethylanilinium tetrapentafluorophenylaluminate, diethylammonium tetrapentatetraphenylaluminate, triphenylphosphonium tetraphenylaluminate, trimethylphosphonium tetraphenylaluminate, tripropylammonium tetra(p-tolyl)borate, triethylammonium tetra(o,p-dimethylphenyl)borate, tributylammonium tetra(p-trifluoromethylphenyl)borate, triphenylcarbonium tetra(p-trifluoromethylphenyl)borate, and triphenylcarbonium tetrapentafluorophenylborate.

As a preferred example, the catalyst for olefin polymerization according to an embodiment of the present invention may further comprise a carrier for supporting the first transition metal compound, the second transition metal compound, or both. Preferably, the catalyst for olefin polymerization may further comprise a carrier for supporting all of the first transition metal compound, the second transition metal compound, and the cocatalyst compound.

In such an event, the carrier may comprise a material containing a hydroxyl group on its surface. Preferably, a material that has been dried to remove moisture from its surface and has a highly reactive hydroxyl group and a siloxane group may be used. For example, the carrier may comprise at least one selected from the group consisting of silica, alumina, and magnesia. Specifically, silica, silica-alumina, and silica-magnesia dried at high temperatures may be used as a carrier. They usually contain oxides, carbonates, sulfates, and nitrates components such as $Na_2O$, $K_2CO_3$, $BaSO_4$, and $Mg(NO_3)_2$. In addition, they may comprise carbon, zeolite, magnesium chloride, and the like. However, the carrier is not limited thereto. It is not particularly limited as long as it can support the first and second transition metal compounds and the cocatalyst compound.

As a method of supporting the transition metal compounds and the cocatalyst compound employed in a catalyst for olefin polymerization on the carrier, a physical adsorption method or a chemical adsorption method may be used.

For example, the physical adsorption method may be a method of contacting a solution in which a transition metal compound has been dissolved with a carrier and then drying the same; a method of contacting a solution in which a transition metal compound and a cocatalyst compound have been dissolved with a carrier and then drying the same; or a method of contacting a solution in which a transition metal compound has been dissolved with a carrier and then drying the same to prepare the carrier that supports the transition metal compound, separately contacting a solution in which a cocatalyst compound has been dissolved with a carrier and then drying the same to prepare the carrier that supports the cocatalyst compound, and then mixing them.

The chemical adsorption method may be a method of supporting a cocatalyst compound on the surface of a carrier, and then supporting a transition metal compound on the cocatalyst compound; or a method of covalently bonding a functional group on the surface of a carrier (e.g., a hydroxy group (—OH) on the silica surface in the case of silica) with a catalyst compound.

The total amount of the first transition metal compound and the second transition metal compound supported on a carrier may be 0.001 mmole to 1 mmole based on 1 g of the carrier. When the content ratio of the transition metal compounds and the carrier satisfies the above range, an appropriate activity of the supported catalyst may be exhibited, which is advantageous from the viewpoint of maintaining the activity of the catalyst and economical efficiency.

The amount of the cocatalyst compound supported on a carrier may be 2 mmoles to 15 mmoles based on the 1 g of the carrier. When the content ratio of the cocatalyst compound and the carrier satisfies the above range, it is advantageous from the viewpoint of maintaining the activity of the catalyst and economical efficiency.

One or two or more types of a carrier may be used. For example, both the first transition metal compound and the second transition metal compound may be supported on one type of a carrier, or the first transition metal compound and the second transition metal compound may be supported on two or more types of a carrier, respectively. In addition, either one of the first transition metal compound and the second transition metal compound may be supported on a carrier.

Preferably, the catalyst for olefin polymerization may a hybrid supported catalyst in which the first transition metal compound and the second transition metal compound are supported together. More preferably, it may a hybrid supported catalyst in which the first transition metal compound and the second transition metal compound are supported together on a single carrier.

For example, the catalyst for olefin polymerization may be a hybrid supported catalyst in which the first transition metal compound, the second transition metal compound, and the cocatalyst compound are supported together on silica. However, the examples of the present invention are not limited thereto.

According to another embodiment of the present invention, there is provided a polyolefin prepared by polymerizing an olefinic monomer in the presence of the catalyst for olefin polymerization described above.

Here, the polyolefin may be a homopolymer of an olefinic monomer or a copolymer of an olefinic monomer and an olefinic comonomer.

The olefinic monomer is at least one selected from the group consisting of a $C_{2-20}$ alpha-olefin, a $C_{1-20}$ diolefin, a $C_{3-20}$ cycloolefin, and a $C_{3-20}$ cyclodiolefin.

For example, the olefinic monomer may be ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, or the like, and the polyolefin may be a homopolymer comprising only one olefinic monomer or a copolymer comprising two or more olefinic monomers exemplified above.

As an exemplary example, the polyolefin may be a copolymer in which ethylene and a $C_{3-20}$ alpha-olefin are copolymerized. Preferred is a copolymer in which ethylene and 1-hexene are copolymerized. But it is not limited thereto.

In such an event, the content of ethylene is preferably 55 to 99.9% by weight, more preferably 90 to 99.9% by weight. The content of the alpha-olefinic comonomer is preferably 0.1 to 45% by weight, more preferably 0.1 to 10% by weight.

The polyolefin according to an embodiment of the present invention may be prepared by polymerization reaction such as free radical, cationic, coordination, condensation, and addition, but it is not limited thereto.

As a preferred example, the polyolefin may be prepared by a gas phase polymerization method, a solution polymerization method, a slurry polymerization method, or the like. When the polyolefin is prepared by a solution polymerization method or a slurry polymerization method, examples of a solvent that may be used include $C_{5-12}$ aliphatic hydrocarbon solvents such as pentane, hexane, heptane, nonane, decane, and isomers thereof; aromatic hydrocarbon solvents such as toluene and benzene; hydrocarbon solvents substituted with chlorine atoms such as dichloromethane and chlorobenzene; and mixtures thereof, but it is not limited thereto.

Polyolefin

The polyolefin according to an embodiment of the present invention satisfies (1) a molecular weight distribution represented as a polydispersity index (Mw/Mn) of 5 to 20, (2) a density of 0.910 to 0.930 g/cm$^3$, (3) a melt index of 0.5 to 2.0 g/10 minutes when measured at 190° C. under a load of 2.16 kg, and (4) a melt index ratio ($MI_{21.6}/MI_{2.16}$) of 20 to 30.

The polyolefin is prepared in the presence of the hybrid supported catalyst for olefin polymerization as described above and has a relatively wide molecular weight distribution. Specifically, the polyolefin has a molecular weight distribution represented as a polydispersity index (Mw/Mn) of 5 to 20. Preferably, the molecular weight distribution represented as a polydispersity index (Mw/Mn) of the polyolefin may be 6 to 15. Since the polyolefin has a relatively wide molecular weight distribution, the polyolefin exhibits excellent processability, whereby a film obtained therefrom may have good impact resistance.

The polyolefin is a low-density polyethylene copolymer having a density in the range of 0.910 to 0.930 g/cm$^3$. Preferably, the density of the polyolefin is in the range of 0.915 to 0.925 g/cm$^3$. If the density of the polyolefin is within the above range, a film obtained from the polyolefin may have good impact resistance.

In the preparation of the polyolefin according to an embodiment of the present invention, the density of the polyolefin may be adjusted by the content of alpha-olefin, preferably 1-hexene, relative to the content of ethylene. For example, the lower the content of alpha-olefin relative to ethylene, the higher the density. The higher the content of alpha-olefin, the lower the density. Thus, a polyolefin having a density within the above range may be prepared by adjusting the content of alpha-olefin relative to the content of ethylene in the polyolefin.

The polyolefin of the present invention has a melt index of 0.5 to 2.0 g/10 minutes when measured at 190° C. under a load of 2.16 kg according to ASTM D1238. Preferably, the melt index of the polyolefin is in the range of 0.5 to 1.5 g/10 minutes when measured at 190° C. under a load of 2.16 kg. If the melt index of the polyolefin is within the above range, it is possible to balance the processability of the polyolefin and the mechanical properties of a film obtained therefrom.

The polyolefin of the present invention has a melt flow ratio (MFR) of 20 to 30, which is a value obtained by dividing the melt index measured at 190° C. under a load of 21.6 kg by the melt index measured at 190° C. under a load of 2.16 kg according to ASTM D1238. Preferably, the MFR of the polyolefin is in the range of 22 to 26. If the MFR of the polyolefin is within the above range, it exhibits excellent processability and is particularly suitable for preparing a blown film.

The polyolefin according to an embodiment of the present invention may have a weight average molecular weight (Mw) of 50,000 to 250,000 g/mole. Preferably, the weight average molecular weight (Mw) may be 70,000 to 150,000 g/mole. Here, the weight average molecular weight is a value measured using gel permeation chromatography (GPC) and converted based on standard polystyrene. If the weight average molecular weight of the polyolefin is within the above range, the mechanical properties of a film produced therefrom may be good.

The polyolefin according to an embodiment of the present invention may have a BOCD index of 0 to 3.0.

Here, the BOCD index refers to a measure of how many short chain branches having 2 to 6 carbon atoms attached to the main chain of a polymer are present in a relatively high molecular weight component. If the BOCD index is 0 or less, it is not a polymer having a BOCD structure. If it is greater than 0, it may be regarded as a polymer having a BOCD structure.

The molecular weight, molecular weight distribution, and content of short chain branches of a polymer may be measured simultaneously and continuously using a GPC-FTIR device. The BOCD index may be calculated by the following Equation 1 by measuring the content of short chain branches (unit: number/1000 C) in the 30% range of left and right (60% in total) in the molecular weight distribution (MWD) based on weight average molecular weight (Mw).

BOCD index=(content of short chain branches in the high-molecular weight component–content of short chain branches in the low-molecular weight component)/(content of short chain branches in the low-molecular weight component)    [Equation 1]

In a polymer having a BOCD structure, tie molecules such as short chain branches are more present in the high molecular weight component that is relatively responsible for physical properties than the low molecular weight component, whereby it may have excellent physical properties such as impact strength.

The polyolefin according to an embodiment of the present invention may have a content of long chain branches of 0.01 to 0.1 per 10,000 carbon atoms.

A long chain branch refers to a long branch having 7 or more carbon atoms attached to the main chain of a polyolefin. It is usually formed when such an alpha-olefin as 1-butene, 1-hexene, and 1-octene is used as a comonomer.

Since long chain branches give rise to the physical effect of filling the voids between polymers, they are known to affect the viscosity and elasticity of a molten polymer in general. If long chain branches increase in the polymer chain, causing an increase in the entanglement of the polymer chain, the intrinsic viscosity at the same molecular weight is lowered, which lowers the load on the screw during extrusion and injection, resulting in better workability.

In the present invention, long chain branches of the polyolefin may be measured by the method described in Macromolecules, Vol. 33, No. 29, pp. 7481-7488 (2000).

The molecular weight distribution (MWD) value is fitted through the complex viscosity measured using MCR702 of Anton Parr, and the maximum peak value is taken. The maximum value of MWD through 3D-GPC is taken. It is then determined from the ratio thereof whether long chain branching is or not. If the ratio is less than 1, the long chain branching value is 0 (Relationship 1a below). If it exceeds 1, the calculated value of Relationship 1b below is taken.

$$\frac{LCB}{10^4\ C} = \frac{GPC\ \text{peak}}{\text{viscosity peak}} < 1, 0 \quad \text{[Relationship 1a]}$$

$$\frac{LCB}{10^4\ C} = \frac{GPC\ \text{peak}}{\text{viscosity peak}} < 1,$$
$$1.125\ \log\left(\frac{GPC\ \text{peak}}{\text{viscosity peak}}\right) \quad \text{[Relationship 1b]}$$

The polyolefin according to an embodiment of the present invention is excellent in melt strength.

When a film is prepared by blowing air into a molten polyolefin to mold the polyolefin into a blown film, bubble stability refers to a feature that the film thus prepared maintains its shape without tearing. The bubble stability is associated with the melt strength.

Melt strength refers to the strength to withstand tension when a polymer in a molten or softened state is processed such as blowing or stretching. The polyolefin of the present invention can exhibit high melt strength since a relatively large number of short chain branches are present in the high molecular weight component, and long chain branches are also attached to the main chain of the polymer.

The polyolefin according to an embodiment of the present invention has a $c_2$ value of −0.3 to −0.2 when a graph of the complex index (Pa·s) with respect to the frequency (rad/s) is fitted with the power law of the following Equation 2.

$$y = c_1 x^{c_2} \quad \text{[Equation 2]}$$

A polymer in a molten state has properties that are in between a fully elastic material and a viscous liquid, which is called viscoelasticity. That is, when a polymer in a molten state is subjected to shear stress, the deformation is not proportional to the shear stress, and the viscosity changes according to the shear stress. These properties are understood to be attributable to the large molecular size and complex intermolecular structure of the polymer.

In particular, when a polymer is used to prepare a molded article, the shear thinning phenomenon is of importance. The shear thinning phenomenon refers to a phenomenon in which the viscosity of a polymer decreases as the shear rate increases. Such shear thinning characteristics have a great impact on the molding method of a polymer.

Equation 2 above is a model for quantitatively evaluating the shear thinning characteristics of a polyolefin and also for predicting the complex viscosity at a high frequency by applying complex viscosity data with respect to the frequency. In Equation 2, x denotes a frequency, y denotes a complex viscosity, and the two variables $c_1$ denotes a consistency index, and $c_2$ denotes a CV index, which represents the slope of the graph. The higher the complex viscosity at a low frequency, the better the physical properties, and the lower the complex viscosity at a higher frequency, the better the processability. Thus, the smaller the value of $c_2$, that is, the larger the negative slope of the graph, the more preferable.

The complex viscosity with respect to the frequency may be measured using, for example, MCR702 of Anton Parr in a frequency range of 0.1 to 500 rad/s and a strain condition of 5% at 190° C.

The polyolefin according to an embodiment of the present invention has a shear thinning index of 10 to 15 as defined by the following Equation 3.

$$\text{Shear thinning index} = \eta_0/\eta_{500} \qquad \text{[Equation 3]}$$

In Equation 3, $\eta_0$ is the complex viscosity at a frequency of 0.1 rad/s, and $\eta_{500}$ is the complex viscosity at a frequency of 500 rad/s.

The larger the shear thinning index, the higher the complex viscosity at a low frequency and the lower the complex viscosity at a higher frequency. Thus, the physical properties and processability of the polymer may be excellent.

Film

According to still another embodiment of the present invention, there is provided a film molded from the polyolefin.

The film according to an embodiment of the present invention comprises the polyolefin of the present invention. Thus, it is excellent in optical properties such as haze and in mechanical properties such as impact strength. It is understood that since the polyolefin of the present invention has a relatively wide molecular weight distribution, and since short chain branches are relatively more present in the high molecular weight component, a film produced therefrom is excellent in haze and impact resistance.

Specifically, the film according to an embodiment of the present invention has a haze of 10% or less and a drop impact strength of 600 g or more.

As an exemplary example, the film of the present invention has a haze of 8% or less, preferably 7% or less, and more preferably 6.5% or less.

In addition, the film of the present invention has a drop impact strength of 650 g or more, preferably 700 g or more, and more preferably 800 g or more.

There is no particular limitation to the method for producing a film according to the embodiment of the present invention, and any method known in the technical field of the present invention can be used. For example, the polyolefin according to an embodiment of the present invention may be molded by a conventional method such as blown film molding, extrusion molding, casting molding, or the like to prepare a film. Blown film molding among the above is the most preferred.

Embodiments for Supporting Out the Invention

Hereinafter, the present invention is explained in detail with reference to the following examples and comparative examples. However, the following examples are intended to further illustrate the present invention. The scope of the present invention is not limited thereto only.

Preparation Example 1

The transition metal compound of Formula A-1 purchased from sPCI was used without purification, and the transition metal compound of Formula B-1 was purchased from MCN and used without further purification.

2.7387 g of the compound of Formula A-1 and 3.3741 g of the compound of Formula B-1 were mixed with 991.69 g of a toluene solution of 10% by weight of methylaluminumoxane (MAO) (Al/Zr=150) in a glove box, which was stirred at room temperature for 1 hour. Meanwhile, 250 g of silica (XP2402) was charged to a reactor, and 500 ml of purified toluene was added thereto, followed by mixing thereof. Thereafter, the transition metal compounds solution was injected into the silica slurry, which was stirred in an oil bath at 75° C. for 3 hours. The supported catalyst was washed three times with toluene and dried at 60° C. under vacuum for 30 minutes to obtain 355 g of a hybrid supported catalyst in the form of a free-flowing powder.

Preparation Example 2

356 g of a hybrid supported catalyst was obtained in the same manner as in Preparation Example 1, except that 1.8310 g of the compound of Formula A-1 and 5.0754 g of the compound of Formula B-1 were used.

Preparation Example 3

359 g of a hybrid supported catalyst was obtained in the same manner as in Preparation Example 1, except that 8.5302 g of the compound of Formula B-1 alone was used.

Example 1

An ethylene/1-hexene copolymer was prepared in the presence of the hybrid supported catalyst obtained in Preparation Example 1 in a fluidized-bed gas-phase reactor. The temperature in the reactor was maintained in the range of 80 to 90° C., and the degree of polymerization of the ethylene/1-hexene copolymer prepared was adjusted by adding hydrogen in addition to ethylene and 1-hexene.

Subsequently, the ethylene/1-hexene copolymer was extruded in an extruder having a screw of 40 mm in diameter, a die of 75 mm in diameter, and a die gap of 2 mm at a screw speed of 80 rpm, and it was then subjected to blown film molding at a blow-up ratio of 2.0 to obtain a film having a thickness of 50 μm.

Example 2

An ethylene/1-hexene copolymer was prepared in the same manner as in Example 1, except that the hybrid supported catalyst obtained in Preparation Example 2 was used. Subsequently, it was molded in the same manner as in Example 1 to obtain a film having a thickness of 50 μm.

Comparative Example 1

An ethylene/1-hexene copolymer was prepared in the same manner as in Example 1, except that the supported catalyst obtained in Preparation Example 3 was used. Subsequently, it was molded in the same manner as in Example 1 to obtain a film having a thickness of 50 μm.

Comparative Example 2

A linear low-density polyethylene (M1810HN) of Hanwha Chemical Corp. manufactured with a single metallocene catalyst was used. This resin was molded in the same manner as in Example 1 to obtain a film having a thickness of 50 μm.

The reaction conditions such as the pressure of ethylene in the reactor and the molar ratio of the raw material gases added in Examples 1 and 2 and Comparative Example 1 are as shown in Table 1 below.

TABLE 1

|  | Ethylene pressure (bar) | Molar ratio of 1-hexene/ ethylene (%) | Molar ratio of hydrogen/ ethylene (%) | Catalytic activity (gPE/ gCat · hr) |
|---|---|---|---|---|
| Ex. 1 | 13.9 | 1.02 | 1.45 | 4,500 |
| Ex. 2 | 13.1 | 1.34 | 0.63 | 4,870 |
| C. Ex. 1 | 13.2 | 0.99 | 0.76 | 6,500 |

Test Example

The physical properties of the resins and films prepared in the Examples and the Comparative Examples were measured according to the following methods and standards. The results are shown in Tables 2 and 3 below.

(1) Melt Index
It was measured at 190° C. under a load of 2.16 kg in accordance with ASTM D1238.
(2) Melt Flow Ratio (MFR)
It was measured at 190° C. under a load of 2.16 kg and 21.6 kg in accordance with ASTM D1238. Their ratio ($MI_{21.6}/MI_{2.16}$) was calculated.
(3) Density
It was measured in accordance with ASTM D638.
(4) Molecular Weight and Molecular Weight Distribution
They were measured using gel permeation chromatography-FTIR (GPC-FTIR).
(5) BOCD Index
It was measured using gel permeation chromatography-FTIR (GPC-FTIR).
(6) Number of Long Chain Branches (LCB)
The molecular weight distribution (MWD) value is fitted through the complex viscosity measured using MCR702 of Anton Parr, and the maximum peak value was taken. The maximum value of MWD through 3D-GPC was taken. The number of long chain branches was calculated from the ratio using Equations 1a and 1b above.
(7) Complex Viscosity with Respect to Frequency
It was measured using MCR702 of Anton Parr in a frequency range of 0.1 to 500 rad/s and a strain condition of 5% at 190° C.
(8) Film Processing and Extrusion Load
A blown film was prepared in a film processing machine having a die of 75 mm Φ and a die gap of 2 mm using a screw of 40 mm Φ. The screw speed was set to 80 rpm, and the blow-up ratio (BUR) was fixed to 2 to process a film having a thickness of 50 μm, and the extrusion load at that time was measured.
(9) Drop Impact Strength (B-Type)
It was measured in accordance with ASTM D1790.
(10) Elmendorf Tear Strength
It was measured in the machine direction (MD) and the transverse direction (TD) in accordance with ASTM D1922.
(11) Tensile Strength
It was measured in the machine direction (MD) and the transverse direction (TD) in accordance with ASTM D882.
(12) Haze
Haze of the blown film was measured in accordance with ASTM D1003.

TABLE 2

| Properties of resin | Unit | Ex. 1 | Ex. 2 | C. Ex. 1 | C. Ex. 2 |
|---|---|---|---|---|---|
| MI | g/10 min | 0.9 | 1.0 | 0.9 | 1.1 |
| MFR | — | 22 | 26 | 19 | 16 |
| Density | g/cm³ | 0.920 | 0.920 | 0.919 | 0.919 |
| Mn | g/mole | 13,700 | 7,100 | 36,700 | 41,900 |
| Mw | g/mole | 116,000 | 100,300 | 113,500 | 109,700 |
| MWD | — | 8.5 | 14.0 | 3.1 | 2.6 |
| BOCD index | — | 0.29 | 0.50 | 0.14 | 0.16 |
| No. of LCB | Count/1,000 C | 0.04 | 0.05 | 0.05 | 0 |
| CV index ($c_2$) | — | −0.26447 | −0.28252 | −0.24333 | −0.20848 |
| Shear thinning index | — | 10.88 | 12.6 | 9.10 | 6.51 |
| Extrusion load | A | 26.0 | 24.5 | 27.5 | 28.5 |

TABLE 3

| Properties of film | Unit | Ex. 1 | Ex. 2 | C.Ex. 1 | C.Ex. 2 |
|---|---|---|---|---|---|
| Drop impact strength | g | 800 | >1,000 | 510 | 650 |
| Elmendorf tear strength | MD | 320 | 420 | 490 | 490 |
| | TD | 820 | 910 | 900 | 700 |
| Tensile strength | MD | 430 | 450 | 390 | 510 |
| | TD | 500 | 570 | 460 | 520 |
| Haze | % | 4.9 | 6.1 | 10.2 | 12.2 |

As can be seen from Tables 2 and 3 and FIGS. 1 to 3, the polyolefins prepared in the presence of the hybrid supported catalyst prepared in the Examples of the present invention had a wide molecular weight distribution, and short chain branches were relatively more present in the high molecular weight component. They also had long chain branches. By virtue of such structural characteristics, not only is the processability of the polyolefins excellent, but also such mechanical properties as drop impact strength and such optical properties as haze are excellent as compared with the films prepared from the polyolefins of Comparative Examples.

INDUSTRIAL APPLICABILITY

Accordingly, the hybrid supported catalyst according to the embodiment of the present invention can provide a polyolefin that has excellent processability, impact strength, and haze. The film made of this polyolefin can be advantageously used as a stretch film, an overlap film, a ramie, a silage wrap, an agricultural film, and the like.

The invention claimed is:

1. A polyolefin having (1) a molecular weight distribution represented as a polydispersity index (Mw/Mn) of 5 to 20, (2) a density of 0.910 to 0.930 g/cm$^3$, (3) a melt index of 0.5 to 2.0 g/10 minutes when measured at 190° C. under a load of 2.16 kg, (4) a melt index ratio (MI$_{21.6}$/MI$_{2.16}$) of 20 to 30, and (5) a $c_2$ value of −0.3 to −0.2 when a graph of complex index (Pa·s) with respect to frequency (rad/s) is fitted with a power law of the following Equation 2:

$$y = c_1 x^{c_2}.\qquad\text{[Equation 2]}$$

2. The polyolefin of claim 1, which has a weight average molecular weight (Mw) of 50,000 to 250,000 g/mole.

3. The polyolefin of claim 1, which has a BOCD index of 0 to 3.0 as defined by the following Equation 1:

BOCD index=(content of short chain branches in the high-molecular weight component−content of short chain branches in the low-molecular weight component)/(content of short chain branches in low-molecular weight component). [Equation 1]

4. The polyolefin of claim 1, which has a content of long chain branches of 0.01 to 0.1 per 10,000 carbon atoms.

5. The polyolefin of claim 1, which has a shear thinning index of 10 to 15 as defined by the following Equation 3:

$$\text{Shear thinning index} = \eta_0/\eta_{500}\qquad\text{[Equation 3]}$$

in Equation 3, $\eta_0$ is a complex viscosity at a frequency of 0.1 rad/s, and $\eta_{500}$ is a complex viscosity at a frequency of 500 rad/s.

6. The polyolefin of claim 1, which is a copolymer of an olefinic monomer and an olefinic comonomer.

7. The polyolefin of claim 6, wherein the olefinic monomer is ethylene, and the olefinic comonomer is at least one selected from the group consisting of propylene, 1-butene, 1-pentene, 4-methyl-1-pentene, 1-hexene, 1-heptene, 1-octene, 1-decene, 1-undecene, 1-dodecene, 1-tetradecene, and 1-hexadecene.

8. The polyolefin of claim 7, which is a linear low-density polyethylene in which the olefinic monomer is ethylene, and the olefinic comonomer is 1-hexene.

9. A film prepared by molding the polyolefin according to claim 1.

10. The film of claim 9, which has a haze of 10% or less and a drop impact strength of 600 g or more.

11. A polyolefin having (1) a molecular weight distribution represented as a polydispersity index (Mw/Mn) of 5 to 20, (2) a density of 0.910 to 0.930 g/cm$^3$, (3) a melt index of 0.5 to 2.0 g/10 minutes when measured at 190° ° C. under a load of 2.16 kg, (4) a melt index ratio (MI$_{21.6}$/MI$_{2.16}$) of 20 to 30, and (5) a shear thinning index of 10 to 15 as defined by the following Equation 3:

$$\text{Shear thinning index} = \eta_0/\eta_{500}\qquad\text{[Equation 3]}$$

in Equation 3, $\eta_0$ is a complex viscosity at a frequency of 0.1 rad/s, and $\eta_{500}$ is a complex viscosity at a frequency of 500 rad/s.

\* \* \* \* \*